July 8, 1941.    M. KLEIN ET AL    2,248,429

METER

Filed July 13, 1938    2 Sheets-Sheet 1

Inventors
Maximilian Klein
Reidar A. Tollefsen

By Strauch & Hoffman
Attorneys

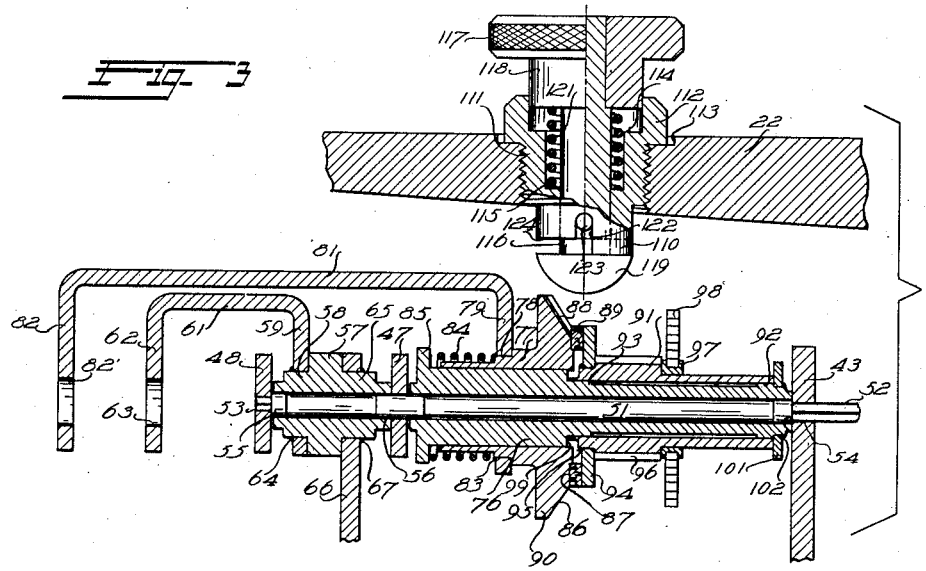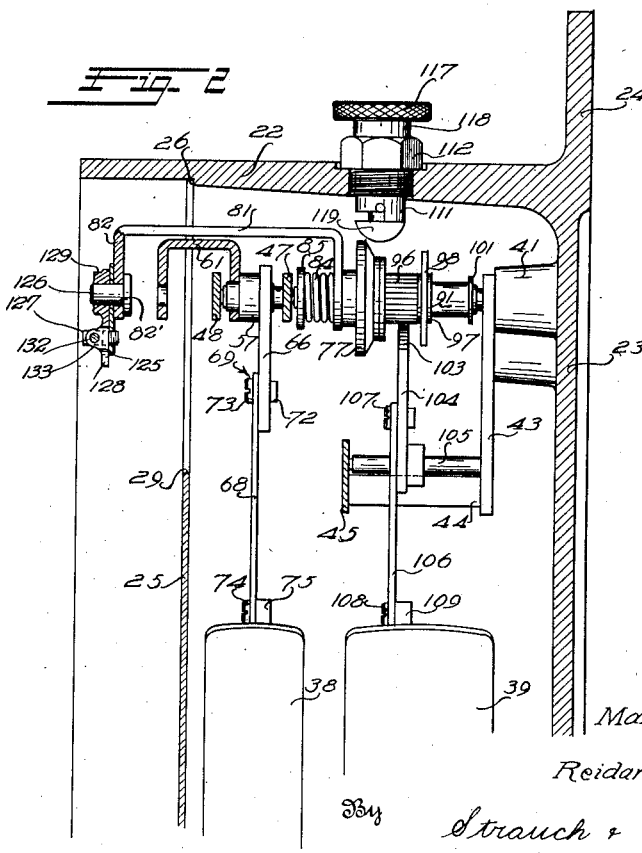

Patented July 8, 1941

2,248,429

UNITED STATES PATENT OFFICE 2,248,429

METER

Maximilian Klein and Reidar A. Tollefsen, Sellersville, Pa., assignors to United States Gauge Company, Sellersville, Pa., a corporation of Pennsylvania Application July 13, 1938, Serial No. 219,075

8 Claims. (Cl. 234—66)

This invention relates to recording or indicating apparatus, and is more particularly concerned with apparatus for making indications or records of a condition for the purpose of assisting and permitting accurate control and study of at least certain phases of that condition.

The invention is of general application in that it can be used for indicating and recording any desired conditions, but its peculiar suitability in the solution of a problem long existent in the oil well drilling industry will now be discussed briefly.

In drilling oil wells, the bit is ordinarily mounted upon the lower end of a rigid hollow drill pipe whose upper end is provided with a cable attached to a suitable hoist. During drilling operations, the drill is partially suspended in the hole to be drilled by means of the cable, and partly rests on the bottom of the hole. An operator, standing at the brakes of the hoists, tries to maintain a predetermined allowable drill pressure at the bottom of the hole by controlling the suspended weight of the drill.

For observing this pressure many operators use a so-called weight indicator, which is attached to the cable at the hoist and indicates the suspended weight of the drill at any time. For example, when the drill is wholly suspended in the hole and not resting upon the bottom, the weight indicator gives its highest reading which represents the total weight of the drill. As the drill is lowered into contact with the bottom of the hole, the suspended weight decreases and the reading on the weight indicator decreases until finally, if the cable is allowed to slacken with the entire weight of the drill supported in the hole, the weight indicator will read zero.

In practical oil well drilling, the total weight of the drill is never allowed to rest on the bottom of the hole and the drill is maintained partially suspended in the hole. The difference between the total weight of the drill and the suspended weight of the drill is known as the load on the bottom of the hole. The suspended weight of the drill is indicated on the weight indicator.

It has been found from experience that drilling operations in different regions involving different geological formations require different loads on the bottom of the hole. Furthermore, this load on the bottom is almost invariably maintained constant during the whole drilling period at any particular hole, no matter how much the actual total weight of the drill increases as the hole deepens and the bit is made longer. In order to maintain this load on the bottom constant, the operator at the hoist watches the weight indicator and tries to keep the pointer thereof at a certain predetermined place during drilling. Some operators use a recorder in place of, or along with, the weight indicator, to make the record of the suspended weight of the drill. This recorder merely records the same suspended weight as indicated on the weight indicator.

In actual practice the allowable loads on the bottom are very small, being represented on the conventional weight indicator or the conventional recorder by only a few scale divisions, since the total suspended weight is usually so much larger in proportion than the allowable load on the bottom and it is very difficult for the operator to maintain the predetermined load on the bottom merely by watching his indicator or recorder. The recent trend, moreover, is toward decreasing the permissible load on the bottom and it is becoming increasingly important to be able to maintain that permissible load on the bottom accurately during drilling operation.

The recording and indicating instruments in use at present as above described, do not permit an accurate determination of the actual load on the bottom and do not present a clear indication of variations in that load on the bottom because they indicate or record the total suspended weight and hence must be calibrated upon relatively small scales. In fact, in some recorders, the thickness of the recorded line alone often represents about 33⅓ to 50 per cent of the allowable load on the bottom. Hence, it has become desirable to develop apparatus which will give a magnified indication or record of the load on the bottom, as maintained during drilling operations, so that the operator may be enabled to control the load more accurately. Also, a clear record of the load and any variations therein can now be obtained for study by the engineering office and for checking up on the accuracy of the operator.

With solution of problems such as the above in mind it is a major object of the invention to provide novel recording and/or indicating apparatus operable to make a magnified or amplified record and/or indication of a condition during a predetermined phase of that condition. Specifically, as applied to the art of oil well drilling, the invention is designed to provide a magnified record and/or indication of the load on the bottom of the hole during actual drilling operations.

A further object of the invention is to provide novel recording apparatus for making separate synchronized records of the same condition, one of the records representing an amplified or magnified embodiment of a portion of the other record. As specifically applied to the art of drilling oil wells, one apparatus records the suspended weight of the drill at all times while the other apparatus records the load on the bottom during drilling operations only.

It is a further object of the invention to provide a novel recording apparatus having a plurality of recorder arms having different amplitudes of movement but both controlled by the same condition. The recorder arms operate concomitantly during certain phases of the condition.

A further object of the invention is to provide a recording apparatus having novel arrangements for rendering the recording apparatus inoperable by the actuating means which is energized by the condition to be recorded. Specifically the recording apparatus is provided with a recorder arm connected to a pressure responsive actuating element by a releasable clutch.

It is a further object of our invention to provide novel recording apparatus wherein a movable recorder arm is actuated through a releasable clutch mechanism which is manually controlled by a suitable clutch release element.

A further object of our invention is to provide novel recording apparatus wherein two recording arms make separate records of different amplitude of at least portions of the same condition. One of the arms makes a record substantially during the whole period that the condition exists while the other arm can be locked for concomitant movement with the first arm during a predetermined portion of the condition to give an amplified record of the condition at that time. Preferably both records are made on the same chart with the arms moving in opposite directions, so as not to interfere with each other.

A further object of the invention is to provide a novel recording apparatus wherein a pair of separate recorder arms are connected to separate pressure responsive elements actuated from a common source responsive to the condition to be recorded. Specifically, one arm is selectively operable only to give a large scale version of a predetermined portion of the record made by the other arm so that the records may be used for close scrutiny of actual operating factors existing during the time that predetermined record portion was made.

Further objects of the invention will appear as the description proceeds in connection with the appended claims and the annexed drawings in which:

Figure 1 is an enlarged view in side elevation of a recording apparatus constructed according to the principles of the invention.

Figure 1A is a fragmentary view illustrating the recorder arm linkage of Figure 1 upon a larger scale.

Figure 2 is a section taken generally along line 2—2 in Figure 1A illustrating the support arrangements and the pressure responsive actuating element for the separate recorder arms.

Figure 3 is an enlarged section taken along line 3—3 of Figure 1A illustrating further the recorder arm support arrangements and the manually operable clutch control member.

When the invention is employed in connection with oil well drilling apparatus or some other apparatus where an operating tool such as a bit suspended from a cable or the like is used, the cable may be connected to a suitable fluid pressure generating device for translating changes in tension on the cable due to the load of the tool into variations in fluid pressure which may be recorded by the instrument illustrated in the drawings. This instrument, of course, is adapted for use with any suitable source of fluid pressure regardless of how the pressure variations are produced therein.

A novel recording apparatus designed for these uses will now be described.

The recording apparatus is mounted in a casing 22 having a closed bottom wall 23 and a circumferential flange 24 extending beyond the casing in alignment with wall 23. Preferably casing 22, wall 23 and flange 24 are integral and provide a substantially cup-shaped container for receiving the recorder apparatus. Casing 22 is provided with a face plate 25 seated upon an internal shoulder 26 formed in the casing walls. As shown in Figure 1, casing 22 is provided with a plurality of lugs 27 having tapped holes 28 for receiving suitable screws (not shown) for securing plate 25 within the casing. Plate 25 is apertured at 29 to permit extension and free movement of recorder arm mechanism which will be later described. Flange 24 is provided with a plurality of apertures 31 for accommodating suitable fastening means (not shown) by means of which the whole apparatus may be mounted upon an instrument board or the like.

A shaft 32 extends axially of casing 22 and projects through a suitable aperture in plate 25 to support a suitable ruled recording chart 33 which is non-rotatably secured thereto by a suitable fastening means 34. Shaft 32 is rotatably driven by means of a suitable clockwork or other similar timing mechanism to advance chart 33 past the recorder arms as will appear later. Shaft 32 and the mechanism for rotating the same may be of any desired conventional construction known in the art and will not be described further since the invention is not concerned with that specific mechanism.

Inside the bottom wall 23 is secured, as by screws 35, a plate 36 supporting a hollow post 37 of some thin relatively rigid material. Post 37 extends through plate 36 and wall 23 and is connected with a fluid pressure conduit 18' which leads to a suitable source of fluid pressure capable of varying in response to changes in the condition to be measured.

A pair of relatively flat, flexible, curved hollow pressure responsive elements 38 and 39, which are preferably of the well known Bourdon tube type and are made of thin flexible metal or some similar material, are each supported at one end in axially displaced relation, upon post 37. Post 37 is in fluid communication with conduit 18' and each of elements 38 and 39 so that elements 38 and 39 are both subjected simultaneously to the fluid pressure of the source to which conduit 18' may be connected.

Bottom wall 23 (as illustrated in Figures 1A and 2) is provided with an upstanding arcuate ledge formation 41 upon which is rigidly secured in some suitable manner, as by screws 42, a flat generally rectangular plate 43 of metal or some rigid material. Plate 43 has non-rotatably secured thereupon, at its two inner corners, a pair of upstanding posts 44, which are bridged by a relatively narrow bearing plate 45. Posts 44 and plate 45 are, preferably, rigidly secured together as by screws 46. At the outer corners of plate 43 are non-rotatably secured two more posts (not shown but similar to though longer than posts 44) for supporting a pair of vertically spaced bridge plates 47 and 48. Suitable bolt means designated at 49 maintain plates 47 and 48 rigidly in spaced relation with respect to plate 43. As shown clearly in Figures 2 and 3, plates 43, 45, 47 and 48 are all parallel and plates 47 and 48 are substantially coextensive.

A shaft 51 extends axially of casing 22 and is non-rotatably supported at its opposite ends where it traverses plates 43 and 48. Preferably end sections 52 and 53 of shaft 51 are squared, or otherwise out of round, to cooperate with similarly shaped apertures in end plates 43 and 48 respectively. Shaft 51 is provided with enlarged cylindrical collar formations 54 and 55 of the same diameter adjacent its opposite ends, and the outer edges of collars 54 and 55 lie substantially flush with the inner surfaces of plates 43 and 48 respectively. Collars 54 and 55 thus provide effective shoulders which abut against plates 43 and 48 and when bolts 49 are tightened shaft 51 is rigidly secured between plates 43 and 48. The peripheral surfaces of collars 54 and 55 are preferably perfectly cylindrical and smooth to serve as bearing surfaces as will later be described.

Shaft 51 is provided intermediate its ends with a further collar formation 56, which extends through a suitable closely fitting aperture in supporting plate 47. Collar 56 extends axially a substantial distance beyond plate 47 for a purpose later to be described. The peripheral surface of collar 56 is perfectly cylindrical and smooth and collar 56 is of the same diameter as collars 54 and 55.

At its outer end, shaft 51 supports a freely rotatable cylindrical sleeve 57, which is rotatably supported adjacent its ends upon collars 55 and 56, and whose opposite ends are disposed substantially in engagement with adjacent surfaces of plates 47 and 48 to prevent axial displacement of sleeve 57 along the shaft beyond the supporting bearing surfaces of collars 55 and 56.

Sleeve 57 is provided, adjacent its outer end, with a reduced portion 58 about which is non-rotatably fastened one leg 59 of a generally U-shaped bracket 61, whose other leg 62 is apertured at 63 for mounting a suitable recording arm, as will be later described. A suitable fastening means 64 which may be integral with sleeve 57, if desired, secures bracket 61 against movement axially of shaft 51. Adjacent its inner end, sleeve 57 is provided with a reduced portion 65, upon which is non-rotatably secured one end of an arcuate arm 66. A suitable fastening means 67, similar to that at 64, retains arm 66 against axial movement with respect to shaft 51.

As shown in Figures 1 and 1A, arm 66 is pivotally and adjustably connected to one end of a link 68 by means of a suitable pivot screw assembly 69, which extends through a suitable aperture adjacent the forward end of link 68, and through an arcuate slot 71 formed in arm 66. Pivot assembly 69 (see Figure 2) is provided with an enlarged socket head 72 at one end and an enlarged screw head 73 at the other end. When screw 73 is tightened the pivot assembly 69 is locked in a fixed position along slot 71 but link 68 is freely pivoted to assembly 69 at all times.

The other end of link 68 is pivotally connected to the free end of the pressure responsive element 38, by means of a pivot screw 74, whose shank extends through a suitable aperture in the lower end of link 68 into threaded engagement with a lug 75 integral with, or rigidly secured to, element 38.

Thus it will be seen that as element 38 flexes in response to pressure changes in the source, link 68 will be displaced to cause rotation of arm 66, sleeve 57 and bracket 61 about the axis of shaft 51. Sleeve 57 is supported by spaced bearing surfaces at 55 and 56 and there is very little frictional resistance to this motion.

A second freely rotatable sleeve 76, substantially longer than sleeve 57, is supported along the inner portion of shaft 51. The opposite ends of sleeve 76 are rotatably supported upon collars 54 and 56 and the opposite edges of sleeve 76 are substantially in engagement with adjacent surfaces of plates 43 and 47 to prevent axial displacement of sleeve 76 along shaft 51 beyond the bearing surfaces at 54 and 56.

A concentric clutch element 77 is slidably and rotatably mounted upon the outer portion of sleeve 76, which is of larger external diameter than the inner portion. Element 77 is provided with a reduced portion 78, forming a ledge upon which is non-rotatably seated one leg 79 of a generally U-shaped recorder arm bracket 81, whose other leg 82 is apertured at 82' for mounting a suitable recorder arm as will be later described. A suitable fastening means 83, which may be integral with element 77, prevents movement of bracket 81 axially of shaft 51.

Element 77 terminates short of the outer end of sleeve 76 and is surrounded by a coil spring 84 which extends between a wide peripheral flange 85 adjacent the end of sleeve 76 and the inner surface of bracket leg 79. Spring 84 tends to displace element 77 to the right in Figure 3.

At its other end, clutch element 77 is provided with an enlarged head 90 having a substantially conical surface 86 which terminates in an annular ledge 87. Surface 86 is preferably knurled or otherwise roughened and is provided with a relatively deep inclined groove 88 whose line of direction lies in a plane containing the axis of shaft 51, for a purpose later to be described. Groove 88 is generally hemi-cylindrical in cross-section and is preferably provided with a smooth internal surface. An annular ring 89 of cork or some similar relatively resilient material, having a high coefficient of friction, is secured upon ledge 87 by a suitable cement or in some other similar manner.

A second clutch element 91 is rotatably and slidably supported concentrically upon spaced bearing shoulders 92 and 93, formed upon the reduced portion of sleeve 76, and is provided with an annular ring 94 non-rotatably secured upon the outer end thereof and maintained against axial displacement by a suitable fastening means 95. Beyond ring 94, clutch element 91 is formed with a plurality of axially extending gear teeth 96; and beyond gear teeth 96, clutch element 91 is reduced in size and has non-rotatably mounted thereupon a ring 97. Ring 97 is grooved at its periphery to seat the inner convolution of a coiled flat hair spring 98, one end of which is attached to ring 97. The other end of hair spring 98 is attached to any suitable part of the apparatus rigid with plate 43. Hair spring 98 tends to urge sleeve 76 to rotate in a predetermined direction for a purpose to be explained later. Excessive axial movement of clutch element 91 is limited at one end by the shoulder 99 at the inner edge of the enlarged portion of sleeve 76, and at the other end by a ring 101 non-rotatably secured adjacent the inner end of sleeve 76 by a suitable fastening means 102.

Adjacent lateral faces of friction ring 89 and ring 94 function as cooperating friction clutch faces as will appear later. The teeth of gear 96 are engaged by teeth 103 of a gear segment 104 which is suitably non-rotatably secured to a pivot shaft 105, extending between spaced end bearings in plates 43 and 45. Shaft 105 is parallel to shaft 51.

Segment 104 is adjustably and pivotally connected to one end of a link 106 by means of a suitable pivot assembly 107 similar to that described at 69 above. Pivot assembly 107 is adjustably secured in an arcuate slot 100 formed in segment 104. The other end of link 106 is pivotally connected to the free end of pressure responsive element 39 by a pivot screw 108 whose shank extends through a suitable aperture in link 106 into threaded engagement with a lug 109, preferably integral with element 39.

Thus, as element 39 flexes in response to pressure changes in the source, link 106 will be displaced to cause rotation of segment 104 about its pivot at 105. Rotation of segment 104, through the engagement of gear teeth 96 and 103, causes rotation of clutch element 91. Hair spring 98 keeps teeth 96 and 103 in constant engagement and prevents back lash due to wear or other factors. With the parts in the clutch engaged position of Figure 3, spring 84 urges clutch element 77 axially into engagement with clutch element 91 with the friction faces at 89 and 94 in driving contact. Any slight longitudinal play which might exist between sleeve 76 and clutch element 91 when the parts are in clutch release position is now taken up under the action of spring 84 and the inner end of clutch element 91 abuts firmly against ring 101.

Sleeve 76 is therefore connected to clutch element 91 by a frictional drive connection so that the above described rotation of clutch element 91 due to actuation of element 39 causes rotation of sleeve 76 and the recorder arm bracket 81 mounted thereupon about shaft 51 as an axis. Pressure element 39 and the segment and gear drive for sleeve 76 are preferably so designed that bracket 81 swings about its axis approximately six times as fast as bracket 61, but it will be understood that any desired ratio between the amplitudes of movement of the recorder arms may be chosen.

A suitable manually operable clutch control member will now be described. Casing 22 is provided with a threaded wall aperture in which is secured an externally threaded hollow socket 111 having a headed portion 112 adapted to seat in a suitable depression 113 upon the outer surface of the casing wall. Socket 111 is provided with an internal annular seat 114 in its head portion 112 and a second internal annular seat 115 of smaller diameter axially displaced inwardly from seat 114.

A plunger 116, having an enlarged knurled head 117 exteriorly of casing 22, is slidably mounted within socket 111. Adjacent head 117, plunger 116 is provided with an enlarged shouldered portion 118 which is slidably disposed within head 112. Plunger 116 extends into the interior of the casing past the inner end of socket 111 and is there formed with an enlarged, smooth surfaced button or head 119 formed preferably of hemispherical shape. A spring 121, disposed within socket 111, surrounds plunger 116 and extends between seat 115 and the lower surface of shoulder 118 to constantly urge plunger 116 toward the exterior of casing 22. Engagement of the button 119 with the bottom of lug 110 at the inner edge of socket 111 limits axial displacement of the plunger in that direction. Seat 114 cooperates with shoulder 118 to limit axial displacement of plunger 116 in the opposite direction.

The inner end of socket 111 projects beyond the casing wall and is formed with a pair of aligned, open ended, longitudinal guide slots 122, which slidably receive oppositely projecting pins 123 extending diametrically from plunger 116. Socket 111 is cut away along its inner edge for the major portion of its periphery to provide a guide surface 124 for pins 123 as will be later described. In Figure 3 the parts are shown in clutch engaged position with the recorder arm carried by bracket 81 in zero or initial position since groove 88 is aligned directly below button 119.

Referring now to Figures 1A and 2, an angularly extending plate 125 is rigidly secured to bracket 81 by some suitable securing means passing through aperture 82' in leg 82. Plate 125 is provided with an upstanding post 126 coaxial with shaft 51 and a second upstanding post 127, which is also pivotally mounted on plate 125. A pen or recorder arm 128 is provided at its inner end with a boss 129 journaled on post 126. Arm 128 is further provided with an arcuate slot 131 concentric with shaft 51. Post 127 extends upwardly through slot 131 and is provided with a diametrically extending threaded bore for receiving the threaded shank of an adjustment screw 132 whose enlarged knurled head abuts against the edge of a hollow supporting boss 133 on arm 128.

In this manner pen arm 128 can be adjusted about the axis of shaft 51 with respect to bracket 81 merely by rotating screw 132. At its outer end pen arm 128 is provided with a marking head 134 carrying a marking point or pen of any suitable type or design (not shown). A second pen arm 135 is adjustably mounted upon bracket 61 in substantially the same manner that pen arm 128 is supported upon bracket 81. Since the specific adjustable mounting of the pen arms with respect to their brackets 61 and 81 is not a necessary part of the present invention, it is believed that no more detailed description of the same is necessary. Plate 48 is cut away at 136 to permit full swinging motion of brackets 81 and 61.

Operation

The operation of the above described recorder as used in earth boring operations will now be described. Conduit 18' is connected to a suitable fluid pressure source actuated by the bit supporting cable so that the recorder will be responsive to the bit loads upon the cable. During the operations preliminary to drilling, pen arm 128 is maintained inoperatively at zero position at a suitable portion of the chart by the depressed plunger 116, which forces apart the friction clutch surfaces at 89 and 94 as described above. The boring tool or bit to be employed is mounted in the hole to be bored and is suspended in the hole until its total suspended weight is carried by the cable and the bottom of the bit almost touches the bottom of the hole. With the bit in this position, the cable will actuate the pressure source to cause pressure to be transmitted simultaneously to pressure responsive elements 38 and 39.

As explained above, distortion of element 39 due to pressure causes proportionate rotation of bracket 61; and recorder arm 135, carried by bracket 61, will rotate in a counter-clockwise direction (Figure 1) to trace a record of the total suspended load. Hence, with the bit almost at the bottom of the hole, record pen 135 will indicate the total weight of the drill, which is the maximum suspended load that can be obtained.

The bit is then slowly lowered into contact with the bottom of the hole and is set to produce a predetermined load at the bottom of the hole corresponding to the desired drilling pressure. The moment the bit touches the bottom of the hole the suspended load begins to decrease. This fact is recorded by arm 135, but that recorded indication is on such a small scale that small variations cannot be precisely noted.

At this point, clutch members 89 and 94 are engaged by withdrawing plunger 116, until head 119 is clear of clutch member 77, and the parts are urged into clutch engaged position by the action of coil spring 84 as explained above. Pen arm 128 will not move at this time because the suspended load has not been varied. Arm 128 and its supporting bracket 81 are now connected to be actuated concomitantly by pressure responsive element 39, as described above. Arm 128 travels in a clockwise direction over chart 33 concomitantly with arm 135 and with an amplitude of movement six times that of arm 135. The record traced by arm 128 will therefore be an amplified record of the fluctuations in the load on the bottom of the hole during drilling operations. By watching carefully the record made by arm 128, the operator is informed of slight fluctuations in load which would not be readily apparent or noticeable in the lower amplitude record and is guided thereby and enabled to precisely set and maintain a predetermined load on the bottom of the hole during drilling operations according to data which has been computed beforehand by the engineering office and the record on the chart is a measure of his efficiency.

As soon as drilling operations are over, plunger 116 is depressed to separate clutch elements 77 and 94 before the bit load is removed so that arm 128 will not be subjected to injurious load conditions. Depression of plunger 116 causes head 119 to engage the conical surface 86 of clutch element 77, which has been rotated in a clockwise direction (Figure 1) by clutch element 94. Continued depression of plunger 116, by reason of engagement between the surface of head 119 and surface 86, will displace element 77 axially of sleeve 76 and shaft 51 until the clutch surfaces at 89 and 94 are separated.

By this time pins 123 will have been displaced below surface 124 and plunger 116 can now be rotated to bring pen arm 128 back to initial or zero position at the outer edge of the chart. It will be observed that the lateral edge of lug 110 permits rotation of plunger 116 only in a clockwise direction (looking down in Figure 3). After pins 123 have been rotated beyond alignment with slots 122, inward pressure on plunger 116 can be released and pins 123 will slide along guide surface 124 as the plunger is rotated. Since surface 86 and the bottom surface of button 119 are in tight frictional engagement, rotation of plunger 116 will cause rotation of clutch element 77 and the pen arm bracket 81 in a counter-clockwise direction as seen in Figure 1. Upon continued rotation of plunger 116, in the same direction surface 86 will be turned until button 119 falls into groove 88. This indicates that the recorder arm is at zero or initial position, and plunger 116 can now be rotated in either direction without further rotation of clutch element 77 since the contacting surfaces of button 119 and groove 88 are smooth and the pressure now exerted by spring 84 is not sufficient to establish a frictional drive between button 119 and the surface of groove 88. Furthermore, spring 84 is coiled about the shank of element 77 in such a manner that it resists rotation of element 77 with respect to sleeve 76 in a direction opposite that involved in returning arm 128 to initial position.

After button 119 falls into groove 88, the operator releases knob 117, and plunger 116 is held in clutch disengaging position by the engagement of pins 123 and surface 124. Further manipulation of knob 117 is unnecessary until it is desired to reengage the clutch elements for recording the load on the bottom during subsequent drilling operations. It is then necessary only to rotate knob 117 until pins 123 become aligned with slots 122 and abut against the lateral edge of lug 110. Release of knob 117 will then permit spring 121 to force plunger 116 outwardly to separate button 119 from clutch element 77 and permit driving engagement between clutch elements 77 and 94.

Although the invention has been described above as applied to a recorder the same principle can also be used in any other indicating instruments. In the recorder embodiment above described, any relative movement between the chart and the recorder arms may be arranged; and, if desired, the recorder arms may be caused to make their records on separate charts moved in synchronism without departing from the broad principle of the invention.

It will further be understood that application of the invention is by no means limited to the measurement of boring tool pressures as above described but may be applied broadly to the measurement and study of any conditions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Exhibiting apparatus adapted to support a scaled member, a pair of separate exhibitor arms for making separate indications on said scaled member, means for actuating each arm in response to forces derived from a common source, one of said arms being designed for amplified movement along said scaled member with respect to the other of said arms, separable clutch elements in the actuating means for said one arm, means for separating said clutch elements to prevent said one arm from being actuated by its actuating means and means for reengaging said clutch elements at any desired point in the operation of said other arm for obtaining a magnified indication of said forces over a predetermined period.

2. Exhibiting apparatus as defined in claim 5, wherein the ratio of movement of the separate arms while they operate in synchronism is of the order of 6 to 1 and the arms move in opposite directions across said scaled member.

3. Recording apparatus comprising a support, a movable chart upon said support, a pair of recording members adapted to make separate records upon said chart, separate pressure responsive elements connected to each of said members, and means for connecting both of said elements to the same source of pressure, one of said pressure responsive elements being of such design and so connected to its recording member as to cause that member to make an amplified record with respect to the other of said members, and selectively operable means providing for actuation of one of said members alone or simultaneous actuation of said members by the respective pressure responsive elements.

4. In a recorder, a support, a shaft mounted on said support, a pair of sleeve means rotatable upon said shaft and a separate recording arm secured to each sleeve, means for rotating one of said sleeves and separate means for rotating the other of said sleeves, said last named means including a releasable clutch whereby the recording arm operated thereby may be rendered selectively inoperable or operable in synchronism with said first named recording arm.

5. In a meter or the like, a support, a shaft mounted upon said support, spaced members rotatable upon said shaft and a separate indicating arm secured to each member, separate means each responsive to the same condition to be measured for independently rotating each of said members and a releasable clutch in the means for rotating one of said members whereby one of said arms may be rendered selectively operable concomitantly with the other.

6. In a meter or the like, an indicating arm, means for actuating said arm comprising separable clutch elements, said arm being secured to one of said clutch elements, a device shiftable into engagement with said one clutch element for separating said clutch elements, said device being further shiftable while engaged with said one clutch element to move said arm to a predetermined position with respect to the scale of said meter, and cooperating formations on said one clutch element and said device for rendering said device inoperable to move said arm over said scale after said predetermined position has been reached.

7. In a meter or the like, an indicating arm, a rotatable clutch element to which said arm is secured, a second clutch element adapted to engage said first named clutch element, a plunger adapted to engage a cooperating formation on said first named clutch element to disengage said clutch elements, said plunger being rotatable to rotate said first named clutch element to move said arm to a predetermined position with respect to the scale of said meter and means interrupting rotation of said first clutch member by said plunger effective when said predetermined position has been reached.

8. In a meter or the like, a rotatable clutch element, an indicating arm secured to said element, an inclined surface on said element, a plunger on said meter adapted to be advanced into engagement with said inclined surface and being rotatable so that rotation of said plunger effects rotation of said clutch element by reason of the frictional engagement therebetween and means at said surface for preventing further rotation of said plunger from moving said arm after the latter has reached a predetermined position with respect to the scale of the meter.

MAXIMILIAN KLEIN.
REIDAR A. TOLLEFSEN.

CERTIFICATE OF CORRECTION.

Patent No. 2,248,429.   July 8, 1941.

MAXIMILIAN KLEIN, ET AL.

It is hereby certified that error appears in the printed specification of the above numbered patent requiring correction as follows: Page 6, first column, line 3, claim 2, for the claim reference numeral "5" read --1--; and that the said Letters Patent should be read with this correction therein that the same may conform to the record of the case in the Patent Office.

Signed and sealed this 12th day of August, A. D. 1941.

(Seal)

Henry Van Arsdale,
Acting Commissioner of Patents.